United States Patent
Kang et al.

(10) Patent No.: US 8,904,436 B2
(45) Date of Patent: Dec. 2, 2014

(54) METHOD AND APPARATUS FOR PROVIDING PREFERRED BROADCAST INFORMATION

(75) Inventors: Sang-wook Kang, Anyang-si (KR); Hee-seon Park, Seoul (KR); Il-hwan Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/222,534

(22) Filed: Aug. 31, 2011

(65) Prior Publication Data

US 2012/0054795 A1   Mar. 1, 2012

(30) Foreign Application Priority Data

Aug. 31, 2010   (KR) .................. 10-2010-0084902

(51) Int. Cl.
| | |
|---|---|
| H04N 5/445 | (2011.01) |
| H04N 21/25 | (2011.01) |
| G06F 17/30 | (2006.01) |
| G06Q 10/10 | (2012.01) |
| H04N 21/482 | (2011.01) |
| H04H 60/46 | (2008.01) |
| H04H 60/37 | (2008.01) |

(52) U.S. Cl.
CPC ........ *H04N 21/252* (2013.01); *G06F 17/30663* (2013.01); *G06Q 10/10* (2013.01); *G06F 17/30867* (2013.01); *G06F 17/3066* (2013.01); *H04N 21/4828* (2013.01); *H04H 60/37* (2013.01); *H04H 60/46* (2013.01)
USPC .................. 725/40; 725/53; 725/56

(58) Field of Classification Search
None
See application file for complete search history.

(56) References Cited

U.S. PATENT DOCUMENTS

| | | | |
|---|---|---|---|
| 6,754,904 B1 * | 6/2004 | Cooper et al. | 725/32 |
| 7,519,658 B1 * | 4/2009 | Anglin et al. | 709/203 |
| 7,689,682 B1 | 3/2010 | Eldering et al. | |
| 2002/0133506 A1 | 9/2002 | Yamato | |
| 2004/0019910 A1 * | 1/2004 | Grenier et al. | 725/70 |
| 2007/0028257 A1 * | 2/2007 | Choi et al. | 725/28 |
| 2008/0244681 A1 * | 10/2008 | Gossweiler et al. | 725/133 |
| 2009/0100469 A1 * | 4/2009 | Conradt et al. | 725/46 |
| 2009/0293079 A1 | 11/2009 | McKee et al. | |
| 2010/0058417 A1 | 3/2010 | Rondeau et al. | |

(Continued)

FOREIGN PATENT DOCUMENTS

| | | |
|---|---|---|
| JP | 2008-191768 | 8/2008 |
| KR | 1020060062967 | 6/2006 |

(Continued)

OTHER PUBLICATIONS

Sarah Reedy, "Is TV the next Facebook?", Mar. 6, 2009, Connected Planet.*

*Primary Examiner* — Hunter B Lonsberry
*Assistant Examiner* — Cynthia Fogg
(74) *Attorney, Agent, or Firm* — The Farrell Law Firm, P.C.

(57) ABSTRACT

A method and apparatus for providing preferred broadcast information are provided. A Social Networking Service (SNS) server is requested to search for pieces of information in an SNS that are related to at least one broadcast channel by providing at least one keyword that identifies the at least one broadcast channel to the SNS server. The pieces of information are extracted from the SNS server. Preferred broadcast information is extracted from the pieces of information. The preferred broadcast information is provided to a user of the apparatus.

20 Claims, 17 Drawing Sheets

(56) References Cited

U.S. PATENT DOCUMENTS

| | | | |
|---|---|---|---|
| 2010/0082434 A1* | 4/2010 | Chen et al. | 705/14.55 |
| 2010/0115554 A1* | 5/2010 | Drouet et al. | 725/41 |
| 2010/0154005 A1* | 6/2010 | Baxter | 725/56 |
| 2011/0107382 A1* | 5/2011 | Morris et al. | 725/109 |
| 2011/0276423 A1* | 11/2011 | Davidson | 705/26.1 |
| 2011/0283304 A1* | 11/2011 | Roberts et al. | 725/9 |
| 2011/0320715 A1* | 12/2011 | Ickman et al. | 711/118 |
| 2012/0066202 A1* | 3/2012 | Hatazawa et al. | 707/710 |
| 2012/0124625 A1* | 5/2012 | Foote et al. | 725/42 |

FOREIGN PATENT DOCUMENTS

| | | |
|---|---|---|
| KR | 100889987 B1 | 3/2009 |
| KR | 1020090027890 A | 3/2009 |
| KR | 1020090036896 | 4/2009 |
| KR | 1020100051961 | 5/2010 |

* cited by examiner

FIG. 8

|  | CNN | ESPN |
|---|---|---|
| Related Keywords | oilspill | Flyers |
|  | News | Blackhawks |
|  | Larryking | stanleycup |
| Related Twitter ID | Donlemoncnn (CNN anchor) | BeautyFrmAshes (VARIOUS NEWS & link Uploader) |
| Related Links | http://bit.ly/aSEzsv (OBAMA-RELATED NEWS) | http://bit.ly/bZ3Ukv (SPORT-RELATED HOT NEWS) |
|  | http://bit.ly/akE4p1 (ARCHAEOLOGY-RELATED DISCOVERY NEWS) |  |

FIG. 9A

Real-time results for #stanleycup ⊕ Save this search

| 2 new tweets since your started searching. | autographone: @RobertaCBS5 Yankees, Blackhawks & the #stanleycup Friday.
about 4 hours ago via Swift zobba.com: Who will win the Stanley Cup in 2011?
http://bit.ly/aKMZuG #StanleyCup
about 3 hours ago via API Barryhoreczy: Wonders why so many people refer to the NFL championship as the Superbowl.
about 2 hours ago via web <stanleycup Twitter search>

FIG. 9B donlemoncnn

[Follow] [Lists ▼] [⚙▼]

@LeannaKnightTS yep iron city rocks about 4 hours ago via UberTwitter in reply to LeannaknightTS LOBSTER ROLLLL. My fave!!!. Gonna inhale it http://tweetphoto.com about 4 hours ago via UberTwitter Mary's Fishcamp Yum!!

http:twwetphot.com/26429737 about 4 hours ago via UberTweeter.

<Donlemoncnn twitter user browsing>

FIG. 9C

Armenian cave yields what may
be world's oldest leather shoe

By Tom Watkins, CNN
June 9, 2010 -- Updated 2131 GMT (0531 HKT)

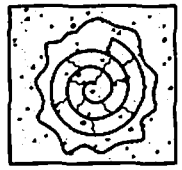

The right-footed shoe probably belonged to a woman, archaeologists say.
STORY HIGHLIGHTS
(CNN) -- Get a kick out of this: Researchers reported Wednesday finding
the world's oldest leather shoe in a cave in Armenia.
The 5,500-year-old one-piece shoe antedates Stonehenge by a
millennium and precedes every loafer, mukluk, wader, clog, bootee,
stiletto, wingtip, mule, Oxford and cross trainer anyone has ever seen,
according to Ron Pinhasi, a lecturer in prehistoric archaeology
at University College Cork in Ireland.

<http://bit.ly/akE4p1 webpage browsing>

FIG. 10

| BROADCASTING STATION | REAL TIME MESSAGE | DISTINCT USER ID |
|---|---|---|
| CNN | 79 | 71 |
| FOX | 13 | 10 |
| BBC | 70 | 52 |
| ESPN | 27 | 11 |
| ABC | 10 | 9 |

METHOD AND APPARATUS FOR PROVIDING PREFERRED BROADCAST INFORMATION

PRIORITY

This application claims priority under 35 U.S.C. §119(a) to Korean Patent Application No. 10-2010-0084902, filed on Aug. 31, 2010 in the Korean Intellectual Property Office, the disclosure of which is incorporated herein by reference.

BACKGROUND OF THE INVENTION

1. Field of the Invention

The present invention relates generally to an apparatus and method for providing preferred broadcast information, and more particularly, to an apparatus and method for providing at least one of broadcast trend information and preferred broadcast channel information using a Social Networking Service (SNS).

2. Description of the Related Art

An Internet Protocol TeleVision (IPTV) broadcasting service, which is also referred to as an Internet multimedia broadcasting service, is provided through an IP network. The IPTV broadcasting service may be combined with various Internet services such as, for example, Internet searching, movie viewing, online shopping, online banking, and online gaming. The IPTV broadcasting service can also provide two-way interactive services.

In the IPTV broadcasting service, only listings of current broadcast programs or channels and basic data may be accessed by using an Electronic Program Guide (EPG), or the like. Therefore, it is difficult for a user of the IPTV broadcasting service to be notified of a hot trend, a hot issue, a hot topic, or a viewing preference of the current broadcast programs or channels.

SUMMARY OF THE INVENTION

The present invention has been made to address at least the above problems and/or disadvantages and to provide at least the advantages described below. Accordingly, an aspect of the present invention provides a method and apparatus for providing preferred broadcast information, and a computer-readable recording medium having embodied thereon a program for executing the method.

According to an aspect of the present invention, a method is provided for providing preferred broadcast information to a user of a channel broadcasting apparatus. An SNS server is requested to search for pieces of information in the SNS that are related to at least one broadcast channel by providing at least one keyword that identifies the at least one broadcast channel to the SNS server. The pieces of information are acquired from the SNS server. Preferred broadcast information is extracted from the pieces of information. The preferred broadcast information is provided to the user of the channel broadcasting apparatus.

According to another aspect of the present invention, an apparatus is provided for providing preferred broadcast information to a user. The apparatus includes an SNS searcher that requests an SNS server to search for pieces of information in the SNS that are related to at least one broadcast channel by providing at least one keyword that identifies the at least one broadcast channel to the SNS server, and acquires the pieces of information from the SNS server. The apparatus also includes a preferred broadcasting information extractor that extracts preferred broadcast information from the pieces of information. The apparatus further includes a preferred broadcast information provider that provides the preferred broadcast information to the user.

According to a further aspect of the present invention, a computer-readable recording medium is provided having embodied thereon a program for executing the method of providing preferred broadcast information. The method includes requesting that a SNS server search for pieces of information in an SNS that are related to at least one broadcast channel by providing at least one keyword that identifies the at least one broadcast channel to the SNS server; acquiring the pieces of information from the SNS server; extracting preferred broadcast information from the pieces of information; and providing the preferred broadcast information to the user of the channel broadcasting apparatus.

BRIEF DESCRIPTION OF THE DRAWINGS

The above and other aspects, features and advantages of the present invention will be more apparent from the following detailed description when taken in conjunction with the accompanying drawings, in which:

FIG. 8 is a diagram illustrating an operation of the apparatus of FIG. 6, according to an embodiment of the present invention;

FIGS. 9A through 9C illustrate an operation of the apparatus of FIG. 6, according to an embodiment of the present invention;

FIG. 10 is a table showing an operation of the apparatus of FIG. 7, according to an embodiment of the present invention;

DETAILED DESCRIPTION OF EMBODIMENTS OF THE PRESENT INVENTION

Figure 1:
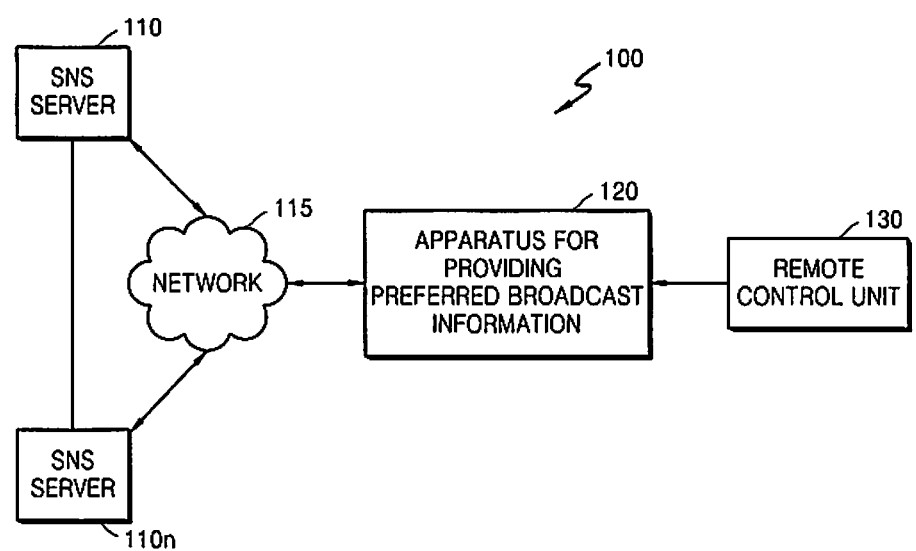
FIG. 1 is a block diagram illustrating a system for providing preferred broadcast information, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a block diagram illustrating a system 100 for providing preferred broadcast information, according to an embodiment of the present invention.

Referring to FIG. 1, the system 100 includes one or more SNS servers 110-110n, and an apparatus 120 for providing preferred broadcast information, which is connected to the one or more SNS servers 110-110n through a network 115. The system 100 further includes a remote control unit 130 for controlling the apparatus 120. However, a device for controlling the apparatus 120 is not limited to the remote control unit 130 and may be any device that transmits an external input signal.

The apparatus 120 may be any apparatus capable of receiving a TV program. For example, the apparatus 120 may be embodied as a TV, a set-top box, a Personal Computer (PC), or a mobile phone that is capable of receiving a TV program. However, the apparatus 120 of the present invention is not limited to these embodiments. The apparatus 120 of FIG. 1 provides preferred broadcast information by using the SNS server 110. The preferred broadcast information may include at least one of broadcast trend information of a specific channel and preferred broadcast channel information from among all broadcast channels.

The broadcast trend indicates, in real-time, information that people have provided based on a specific broadcast channel or program. The broadcast trend can be provided according to specific geographic regions. The needs of a user may be analyzed in real-time using the broadcast trend information, and companies may conduct actions in accordance with a result of the analysis. Users may easily obtain additional information on the specific broadcast channel or program from information provided by others in the SNS. A broadcast trend may be limited to a real-time broadcast program-related topic. Accordingly, when a real-time broadcast trend of a broadcast program is analyzed, a popular broadcast program may be determined and recommended to users who have not yet decided on a program to watch. More specifically, examples of the broadcast trend include, for example, a keyword, a Uniform Resource Locator (URL), and a user IDentifier (ID). For example, if a program 'SBS Sports News' of a channel 'SBS' is currently being watched, the broadcast trend may be a related keyword, such as, 'World Cup', 'Korea', or 'Jisung Park', a URL of a related article, or the like.

The preferred broadcast channel is a most preferred or popular broadcast channel or program during a specific time, from among all broadcast channels. For example, from among all channels, e.g., MBC, CNN, SBS, FOX, KBS, and ESPN, a most preferred channel during a specific time may be 'ESPN', and a second most preferred channel may be 'FOX'.

The SNS is an online service that focuses on building social relations among people. The SNS is a community-type website in which members introduce their friends to other members for the purpose of extending social relations. Examples of the SNS include Facebook®, MySpace®, Twitter®, LinkedIn®. The most recent SNSs are web-based services. An SNS is a new method of sharing information or communicating with others, and millions of people use social networking websites every day. The most commonly used SNSs divide people according to certain categories, enable users to contact friends, and recommend information based on a reliability between users.

Since the apparatus 120 uses the SNS server 110 in order to search for preferred broadcast information, the apparatus 120 may specify that the search is conducted among at least one of: a group consisting of all users using an SNS, a group consisting of users registered as friends in the SNS, and a group consisting of users registered as members of particular concern in the SNS. However, the present invention is not limited to these groupings, and a group that is classified under specific conditions in the SNS may also be used. Specifically, the apparatus 120 may search for a preferred broadcast channel or a broadcast trend from among all SNS users or friends of a current viewer.

The remote control unit 130 may control the apparatus 120 to provide the preferred broadcast information. Also, in an embodiment of the present invention, the remote control unit 130 may have functions enabling a user to request at least one of broadcast trend information and preferred broadcast channel information, to select a broadcast channel or a broadcast channel list, and to request broadcast trend information to be registered or tracked as an interesting broadcast trend. Also, such functions may map to function keys (e.g., a trend button and a preferred channel button), or direction keys and a selection key (e.g., an OK button) of the remote control unit 130. However, the present invention is not limited to the above-described embodiments.

Figure 2:
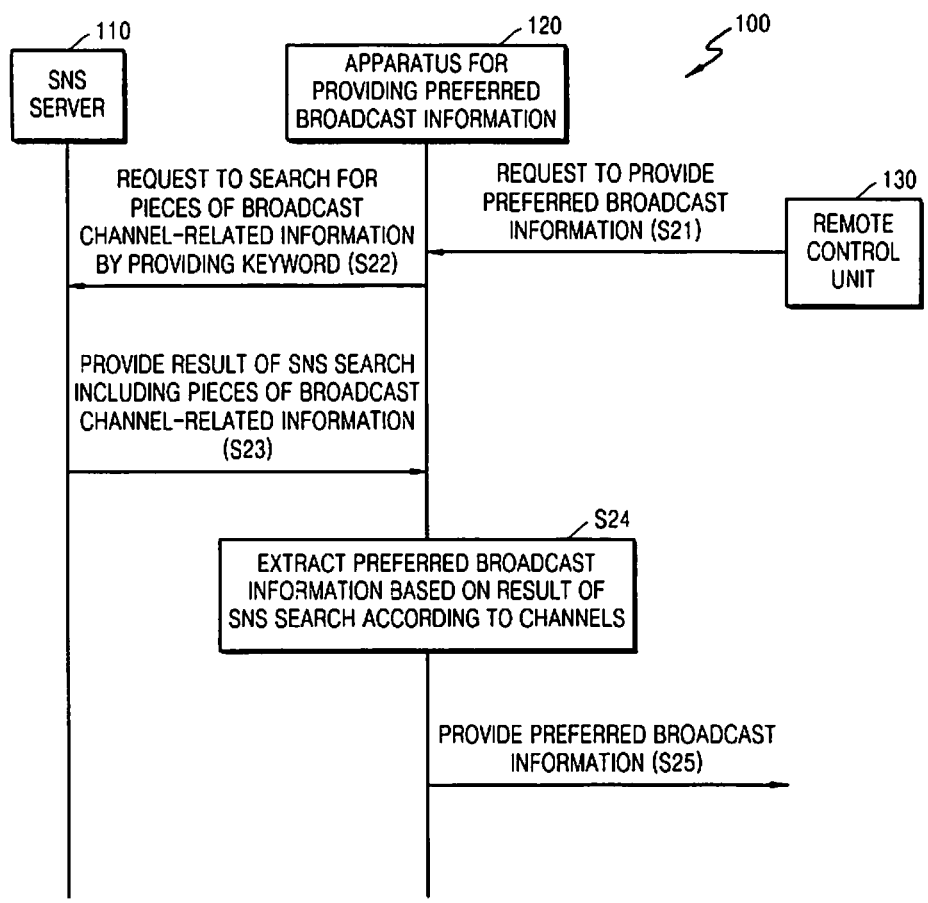
FIG. 2 is a diagram illustrating an operation of the system of FIG. 1, according to an embodiment of the present invention.

FIG. 2 is a diagram illustrating an operation of the system 100 of FIG. 1, according to an embodiment of the present invention.

In step S21, a user requests that the apparatus 120 provide preferred broadcast information through an operation of the remote control unit 130.

In step S22, the apparatus 120 requests that the SNS server 110 search for pieces of broadcast channel-related information posted on the SNS server 110 by providing a keyword that identifies at least one broadcast channel to the SNS server 110.

In step S23, in response to the request, the SNS server 110 provides a result of the search, which includes the pieces of broadcast channel-related information. The broadcast channel-related information may include information posted in the SNS in real-time and metadata thereof. Locations and content of the pieces of the broadcast channel-related information, information about a writer of the information, conditions of rights, conditions of use, history of use, etc., are included in the metadata.

In step S24, the apparatus 120 extracts preferred broadcast information based on the pieces of broadcast channel-related information. The preferred broadcast information may include at least one of broadcast trend information and preferred broadcast channel information.

In step S25, the apparatus 120 provides or outputs the preferred broadcast information to the user.

Figure 3:
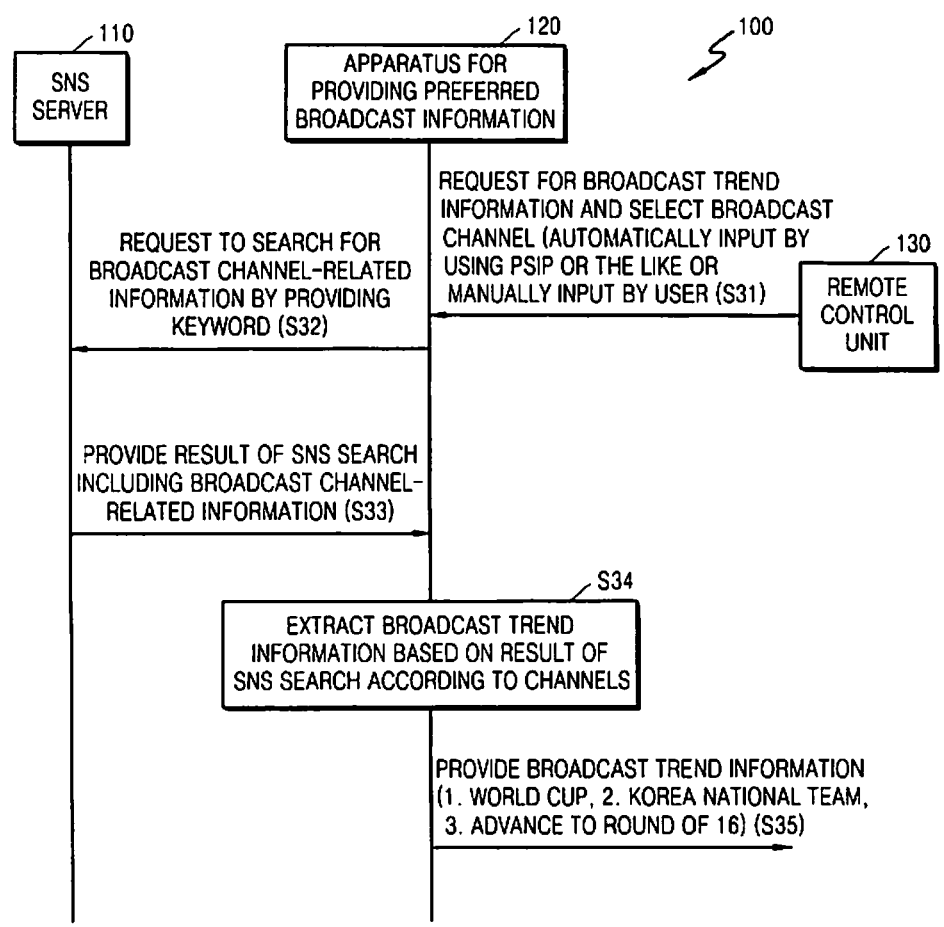
FIG. 3 is a diagram illustrating an operation of the system of FIG. 1 that provides broadcast trend information, according to an embodiment of the present invention.

FIG. 3 is a diagram illustrating an operation of the system 100 that provides broadcast trend information, according to an embodiment of the present invention.

In step S31, a user requests that the apparatus 120 provide real-time broadcast trend information of a broadcast channel/program, which the user is currently watching, by operating the remote control unit 130. After receiving a request to provide broadcast trend information, the apparatus 120 may automatically extract a broadcast channel/program, which the user is currently watching, by using a Program and System Information Protocol (PSIP), or the like. The PSIP is a communication protocol that is used to transmit information about each channel in a broadcast transport stream in an Advanced Television Systems Committee (ATSC) digital television system. PSIP data defines evaluation information according to content of a film and virtual channel and EPG information, such as a title and a synopsis. The apparatus 120 may automatically select a broadcast channel, which the user is currently watching, by receiving such PSIP data.

In step S32, the apparatus 120 requests that the SNS server 110 search for the channel SBS by providing 'SBS' as a keyword to the SNS server 110.

In step S33, in response to the request, the SNS server 110 provides a result of the search, including an SBS character sequence, to the apparatus 120. The result of the search is information that includes the SBS character sequence posted in real-time on an SNS, and may further include metadata thereof.

In step S34, the apparatus 120 extracts broadcast trend information of the channel SBS by analyzing additional keywords often input by users from among words included in the SBS character sequence. If SNS users often input keywords like 'World Cup' and 'Korean national team' related to the channel SBS, a broadcast trend of the channel SBS may be 'World Cup' or 'Korean national team'. A broadcast trend of a channel is not limited to a keyword, and may be an URL, or an SNS user ID.

In step S35, the apparatus 120 provides or outputs 'World Cup' or 'Korean national team,' which is the broadcast trend of the channel SBS, to the user.

Figure 4:
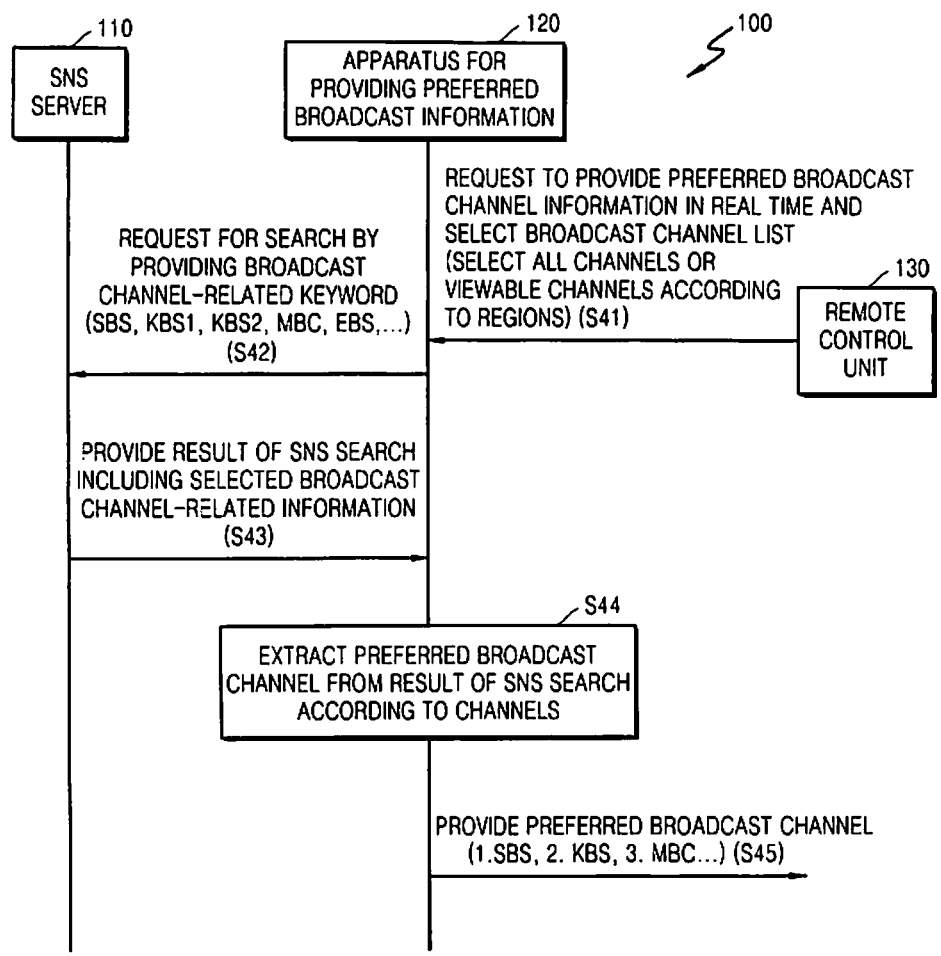
FIG. 4 is a diagram illustrating an operation of the system of FIG. 1 that provides preferred broadcast channel information, according to an embodiment of the present invention.

FIG. 4 is a diagram illustrating an operation of the system 100 that provides preferred broadcast channel information, according to an embodiment of the present invention.

In step S41, a user requests that the apparatus 120 provide preferred channel information of broadcast channels in a broadcast channel list, for example, SBS, KBS1, and KBS2, through an operation of the remote control unit 130. The broadcast channel list may include channels viewable on the apparatus 120 according to a current region, or may include all channels.

In step S42, the apparatus 120 requests that the SNS server 110 search by providing a broadcast channel-related keyword according to each channel in the list to the SNS server 110.

In step S43, the SNS server 110 provides a result of the search to the apparatus 120.

In step S44, the apparatus 120 extracts a preferred channel based on the result of the search. An analysis is performed based on SNS data, a time at which data is written, or the like, in the result of the search. For example, a channel having a high SNS search value in the result of the search may be a preferred channel. In accordance with the method of FIG. 3, a time when audience ratings increase, a scene which is broadcast at a time when audience ratings increase, a keyword, or the like, may be provided in addition to the preferred broadcast channel by analyzing a time when an SNS search value increases.

In step S45, the apparatus 120 collects a result of the analysis according to each channel, and provides or outputs preferred channels to the user in a preset order in real-time.

Figure 5:
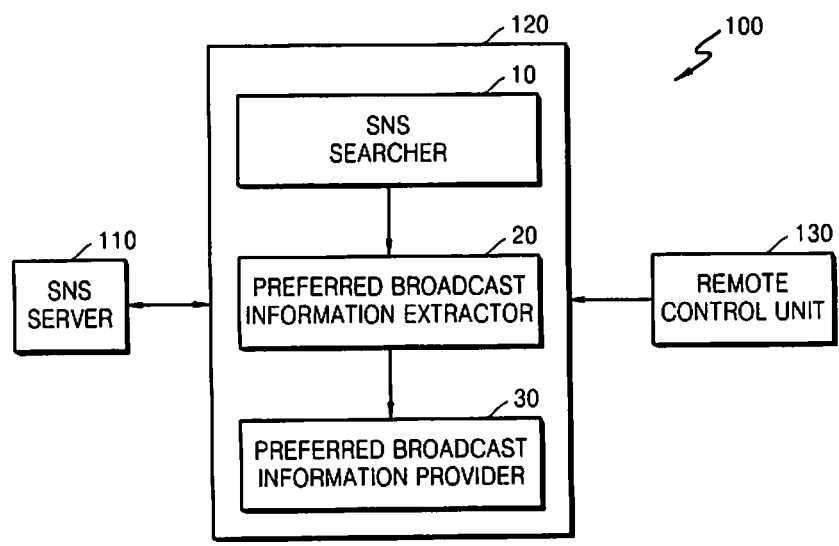
FIG. 5 is a block diagram illustrating an apparatus for providing preferred broadcast information, according to an embodiment of the present invention.

FIG. 5 is a block diagram illustrating the apparatus 120, according to an embodiment of the present invention.

Referring to FIG. 5, the apparatus 120 includes an SNS searcher 10, a preferred broadcast information extractor 20, and a preferred broadcast information provider 30.

The SNS searcher 10 requests the that SNS server 110 search for pieces of broadcast channel-related information posted in real-time on an SNS by providing at least one keyword for identifying at least one selected broadcast channel to the SNS server 110. The SNS searcher 10 acquires the pieces of broadcast channel-related information from the SNS server 110. A keyword for identifying a broadcast channel may also be used to identify a broadcast program. The apparatus 120 may further include a network 115 interface for connecting the SNS server 110 and the apparatus 120.

The preferred broadcast information extractor 20 extracts at least one piece of preferred broadcast information from the acquired pieces of broadcast channel-related information. The preferred broadcast information may include at least one of broadcast trend information and preferred broadcast channel information.

The preferred broadcast information provider 30 provides the at least one preferred broadcast information to a user, and may be embodied as, for example, a display.

Figure 6:
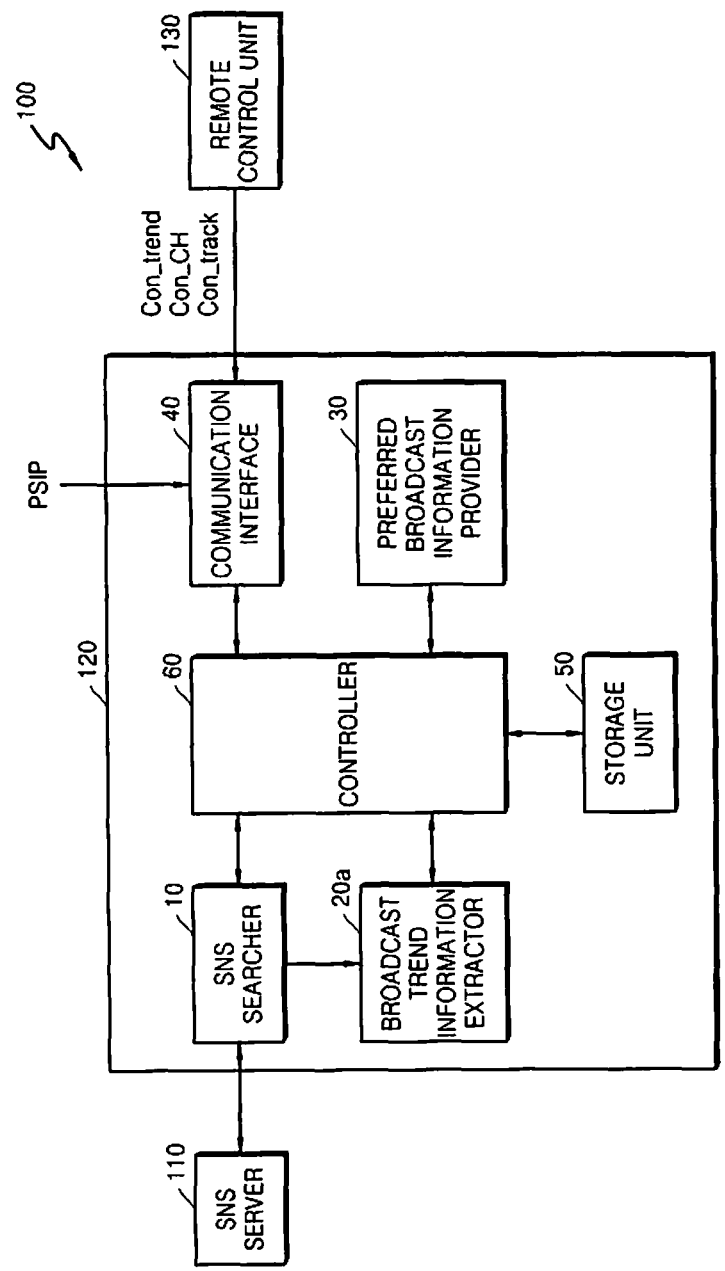
FIG. 6 is a detailed block diagram illustrating the apparatus of FIG. 5, which provides broadcast trend information, according to an embodiment of the present invention.

FIG. 6 is a detailed block diagram illustrating the apparatus 120, which provides broadcast trend information, according to an embodiment of the present invention.

The apparatus 120 includes the SNS searcher 10, a broadcast trend information extractor 20a, and the preferred broadcast information provider 30. The broadcast trend information extractor 20a may be included in the preferred broadcast information extractor 20 of FIG. 5. The apparatus 120 further includes a communication interface 40, a storage unit 50, and a controller 60.

The communication interface 40 manually receives, from the remote control unit 130, a control signal Con_trend for selecting and executing a broadcast trend information providing function of the apparatus 120, a control signal Con_CH for selecting a broadcast channel related to the broadcast trend information, and a control signal Con_track for selecting and executing a broadcast trend registering and tracking function. However, a control signal input through the remote control unit 130 is not limited thereto.

The communication interface 40 may also automatically receive a current broadcast channel by using, for example, PSIP data or the like.

The SNS searcher 10 requests that the SNS server 110 search for pieces of broadcast channel-related information posted in real-time on a corresponding SNS, by providing a keyword that identifies the selected broadcast channel to the SNS server 110. The SNS searcher 10 acquires the pieces of broadcast channel-related information from the SNS server 110.

The broadcast trend information extractor 20a extracts at least one piece of broadcast trend information from the acquired pieces of broadcast channel-related information. The at least one piece of broadcast trend information may be extracted by analyzing texts of the pieces of the broadcast channel-related information and extracting a keyword or a URL that is often used, a user who provides related information, a time when audience ratings increase, or a scene which is broadcast at a time when audience ratings increase. However, the present invention is not limited the extraction methodology described in this embodiment, and the at least one piece of broadcast trend information may be extracted by any other method that achieves a similar result.

The preferred broadcast information provider 30 provides the analyzed at least one piece of broadcast trend information to the user.

In order to register and track broadcast trend information, such as, for example, 'News', 'Donlemoncnn', or a specified link, the remote control unit 130 transmits the broadcast channel tracking control signal Con_track to the communication interface 40. The controller 60 receives the broadcast channel tracking control signal Con_track through the communication interface 40. The controller 60 requests the SNS server 110 to enable the SNS searcher 10 to continuously track pieces of information related to the selected broadcast trend information, e.g., Donlemoncnn. The controller 60 also controls the SNS searcher 10 to acquire the tracked broadcast trend information from the SNS server 110. However, the remote control unit 130 may directly control the SNS searcher 10 instead.

The preferred broadcast information provider 30 provides the broadcast trend information acquired by the SNS searcher 10 to the user.

The storage unit 50 stores broadcast channel-related information, broadcast trend information-related information, etc.

The controller 60 controls operations of the SNS searcher 10, the broadcast trend information extractor 20a, the storage unit 50, the communication interface 40, and the preferred broadcast information provider 30.

Figure 7:
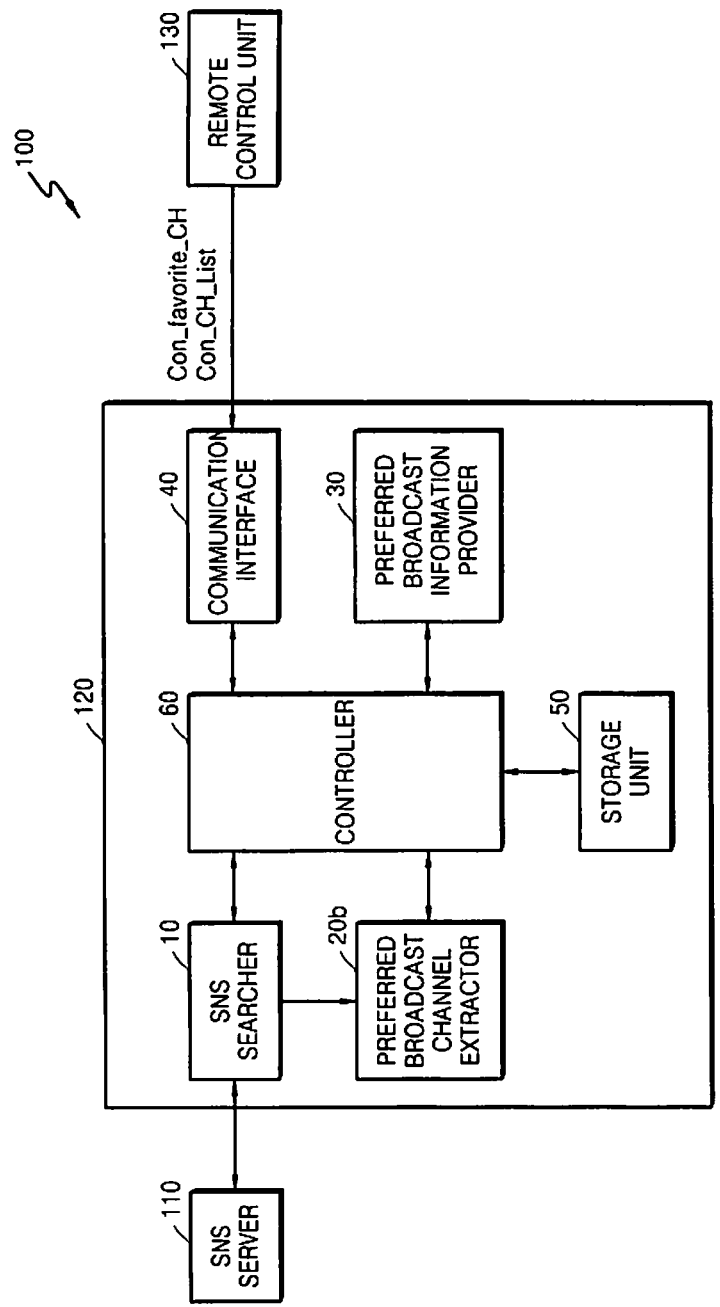
FIG. 7 is a detailed block diagram illustrating the apparatus of FIG. 5, which provides preferred broadcast channel information, according to an embodiment of the present invention.

FIG. 7 is a detailed block diagram illustrating the apparatus 120, which provides preferred broadcast channel information, according to an embodiment of the present invention.

The apparatus 120 includes the SNS searcher 10, a preferred broadcast channel extractor 20b, and the preferred broadcast information provider 30. The preferred broadcast channel extractor 20b may be included in the preferred broadcast information extractor 20 of FIG. 5. The apparatus 120 further includes the communication interface 40, the storage unit 50, and the controller 60.

The communication interface 40 manually receives, from the remote control unit 130, a control signal Con_favorate_CH for selecting and executing a preferred broadcast channel providing function and a control signal Con_CH_list for selecting a broadcast channel list.

The control signal Con_CH_list selects a broadcast channel list, such as a list of broadcast channels viewable based on locations/zip codes of users or a list of all broadcast channels.

The channels viewable based on the locations/zip codes of the users may already be stored in the storage unit 50 or an external server and may then be loaded into the controller 60 in response to the control signal Con_CH_list.

The SNS searcher 10 requests the SNS server 110 to search for pieces of broadcast channel-related information posted in real-time on a corresponding SNS according to broadcast channels in a broadcast channel list, by providing keywords that identify the broadcast channels in the broadcast channel list to the SNS server 110. The SNS searcher 10 acquires the pieces of broadcast channel-related information from the SNS server 110.

The preferred broadcast channel extractor 20b determines preferences of the broadcast channels from the stored pieces of broadcast channel-related information, and extracts at least one preferred broadcast channel from the broadcast channels based on the determined preferences. There are several ways to analyze preferences from pieces of broadcast channel-related information. An example of one such method is described in greater detail below.

The number of pieces of real-time broadcast channel-related information is counted for each channel in the list, and a preference of each channel is determined in proportion to the number.

The number of distinct user IDs attached to pieces of broadcast-related information is counted for each channel in the list, and a preference is determined for each channel in proportion to the number.

A preference is determined based on a distribution of times when pieces of broadcast channel-related information are written for each broadcast channel. For example, when a broadcast channel is analyzed at 09:00, the number of pieces of broadcast-related information provided from 08:00 to 09:00 for a channel 'CNN' may be 40, and the number of pieces of broadcast channel-related information provided from 08:30 to 09:00 for the channel CNN may be 30. The number of pieces of broadcast-related information provided from 08:00 to 09:00 for a channel 'FOX' may be 50, and the number of pieces of broadcast channel-related information provided from 08:30 to 09:00 for the channel 'FOX' may be 20. Accordingly, a preference of the channel 'CNN' may be determined to be higher than a preference of the channel 'FOX'.

The preferred broadcast information provider 30 provides at least one preferred broadcast channel. For example, a top 10 most preferred broadcast channels may be provided in an order from highest to lowest.

The controller 60 controls operations of the SNS searcher 10, the preferred broadcast channel extractor 20b, the storage unit 50, the communication interface 40, and the preferred broadcast information provider 30.

Thus, FIGS. 6 and 7 are block diagrams illustrating operations of the apparatus 120 to provide broadcast trend information and preferred broadcast channel information, respectively. Although the preferred broadcast information extractor 20 is described as including either the broadcast trend information extractor 20a or the preferred broadcast channel extractor 20b, the broadcast trend information extractor 20a and the preferred broadcast channel extractor 20b may both be integrated into one device. Specifically, the broadcast trend information extractor 20a and the preferred broadcast channel extractor 20b may be alternately or simultaneously enabled in one device.

FIG. 8 is a diagram illustrating an operation of the apparatus 120 of FIG. 6, according to an embodiment of the present invention.

Referring to FIGS. 6 and 8, since a broadcast channel that is being currently watched is 'CNN' or 'ESPN', the channel 'CNN' or 'ESPN' may be automatically selected by using PSIP data, or the channel 'CNN' or 'ESPN' may be manually selected by using a broadcast channel selecting control signal Con_CH.

The SNS searcher 10 requests a Twitter® server to search for pieces of CNN-related information or pieces of ESPN-related information posted in real-time on Twitter® by providing a keyword, e.g., #CNN or #ESPN, to the Twitter® server. Next, the SNS searcher 10 may acquire the pieces of CNN-related information or the pieces of ESPN-related information from the Twitter® server.

The broadcast trend information extractor 20a extracts at least one piece of broadcast trend information from the acquired pieces of CNN related information, such as, for example, a related keyword (e.g., oilspill, News, or Larryking), a related Twitter® ID (e.g., Dolemoncnn (CNN anchor)), or a related link. Also, the broadcast trend information extractor 20a extracts at least one piece of broadcast trend information from the acquired pieces of ESPN-related information, such as, for example, a related keyword (e.g., Flyers, Blackhawks, or stanleycup), a related Twitter® ID (e.g., BeautyFrmAshes), or a related link.

The preferred broadcast information provider 30 provides the extracted broadcast trend information, as shown in FIG. 8.

A method of registering and tracking specific information from among provided broadcast trend information as interesting broadcast trends is described in greater detail below with reference to FIGS. 9A-9C.

FIGS. 9A-9C are illustrate an operation of the apparatus 120 of FIG. 6, according to another embodiment of the present invention.

Referring to FIGS. 6 and 9A-9C, the controller 60 requests a Twitter® server to enable the SNS searcher 10 to continuously track pieces of 'stanleycup'-related information, pieces of 'donlemoncnn'-related information, and pieces information related to a specified link. The controller 60 controls the SNS searcher 10 to acquire the pieces of 'stanleycup'-related information, the pieces of 'donlemoncnn'-related information, and the of pieces link-related information from the Twitter® server.

The preferred broadcast information provider 30 provides the pieces of 'stanleycup'-related information, the pieces of 'donlemoncnn'-related information, and the pieces of link-related information as shown in FIGS. 9A, 9B, and 9C.

FIG. 10 is a table showing an operation of the apparatus 120 of FIG. 7, according to an embodiment of the present invention.

Referring to FIGS. 7 and 10, a broadcast channel list including broadcast channels, e.g., CNN, FOX, BBC, ESPN, and ABC, which are viewable based on, for example, locations/zip codes of users, may be selected by using a broadcast channel list selecting control signal Con_CH_list.

Based on the broadcast channel list selecting control signal Con_CH_list, the controller 60 requests the SNS server 110 to enable the SNS searcher 10 to search for pieces of 'CNN'-related information, pieces of 'FOX'-related information, pieces of 'BBC'-related information, pieces of 'ESPN'-related information, and pieces of 'ABC'-related information posted in real-time on Twitter® by providing keywords, e.g., #CNN, #FOX, #BBC, #ESPN, and #ABC to the SNS server 110. The controller 60 acquires the pieces of 'CNN'-related information, the pieces of 'FOX'-related information, the pieces of 'BBC'-related information, the pieces of 'ESPN'-related information, and the pieces of 'ABC'-related information from the SNS server 110.

The preferred broadcast channel extractor 20b may determine real-time preferences of the broadcast channels from the pieces of 'CNN'-related information, the pieces of 'FOX'-related information, the pieces of 'BBC'-related information, the pieces of 'ESPN'-related information, and the pieces of 'ABC'-related information.

For example, referring to FIG. 10, preferences of broadcast channels may be analyzed by counting the number of pieces of real-time broadcast channel-related information and a number of distinct user IDs for each broadcast channel. When the preferences of the broadcast channels are determined, sentiments of tweets (positive or negative), location information, a distribution of times when tweets are written, and so on may be additionally analyzed.

When preferences are determined with reference to FIG. 10, the channel CNN ranks first, the channel BBC ranks second, the channel ESPN ranks third, the channel FOX ranks fourth, and the channel ABC ranks fifth.

The controller 60 controls the preferred broadcast information provider 30 to provide a preset number of (e.g., top 5) most preferred broadcast channels.

Trend information according to preferred broadcast channels may be extracted, registered as an interesting trend, and tracked, which is described above with reference to FIGS. 6, 8, and 9A through 9C.

Figure 11:
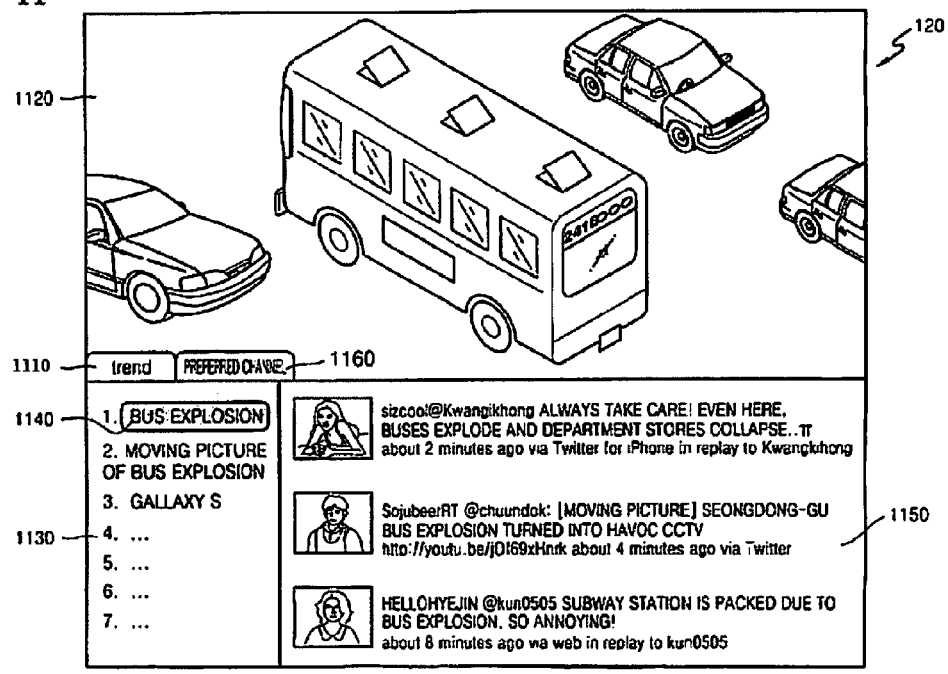
FIG. 11 illustrates a screen of the apparatus of FIG. 7, according to an embodiment of the present invention.

FIG. 11 illustrates a screen 1120 of the apparatus 120 of FIG. 7, according to an embodiment of the present invention.

A user currently watching a program 'SBS 9 News' wants to see real-time broadcast trend information. If the user selects a trend tab 1110 through an operation of the remote control unit 130, real-time broadcast trends 1130 related to the program 'SBS 9 News' may be shown on the screen 1120 of the apparatus 120 in a predetermined order (e.g., 1. bus explosion 1140, 2. moving picture of bus explosion, 3. galaxy S.). If the user wants to continuously track messages 1150 posted by his friends, e.g., sizcool, SojubeerRT, and HELLO-HYEJIN, about the bus explosion 1140, the user may view the messages 1150 by selecting '1. bus explosion' 1140 with the remote control unit 130.

Also, preferred channel rankings may be displayed when the user selects a preferred channel tab 1160 via the remote control unit 130.

As described above, the apparatus 120 is advantageous in that many broadcast channel viewers are currently using SNSs, such as Twitter® and Facebook®. Many pieces of real-time broadcast-related information are included in SNS data. When the SNS data is processed and provided to the viewers, the viewers have a more developed TV watching experience.

The apparatus 120 is also advantageous in that real-time channel-related broadcast trend information may be provided to users. Additional information and broadcast trend information related to a program may be detected from broadcast trend information of SNS users who are simultaneously viewing a broadcast channel. The viewers obtain information related to a current broadcast by using the broadcast trend information. For example, when a channel is changed, a user may easily browse trending information on a current program before watching the current program and without reading all of the related comments. Also, the broadcast trend information may be developed with an additional search keyword. Specifically, searched broadcast trend information may be continuously tracked.

The apparatus 120 also recommends a broadcast to a user in real-time. Since a preferred channel is determined and provided to the user, when a channel is changed to a preferred channel, a more satisfying result may be obtained than when a channel is selected by using mechanical recommendation or a program is selected by using an existing broadcast program description.

Preferred channel information may be obtained by restricting a search to friends on the SNS instead of all users. A more satisfying channel recommendation result may be obtained based on this restricted search.

The apparatus 120 may be used as an element in a social TV.

The apparatus 120 is also advantageous in that an SNS is searched by using specific keywords relating to broadcast channels, and preferred broadcast channel rankings are determined based on a result of the search. Viewers may write their opinions about a broadcast channel on an SNS, and preferred broadcast channel rankings may be determined based on a number of such opinions, a number of people who post their opinions, and times when the opinions are posted.

A broadcasting rating survey server is not required in the embodiments of the present invention. A method of examining a preferred broadcast channels is instead dependent on a result of an SNS search.

Figure 12:
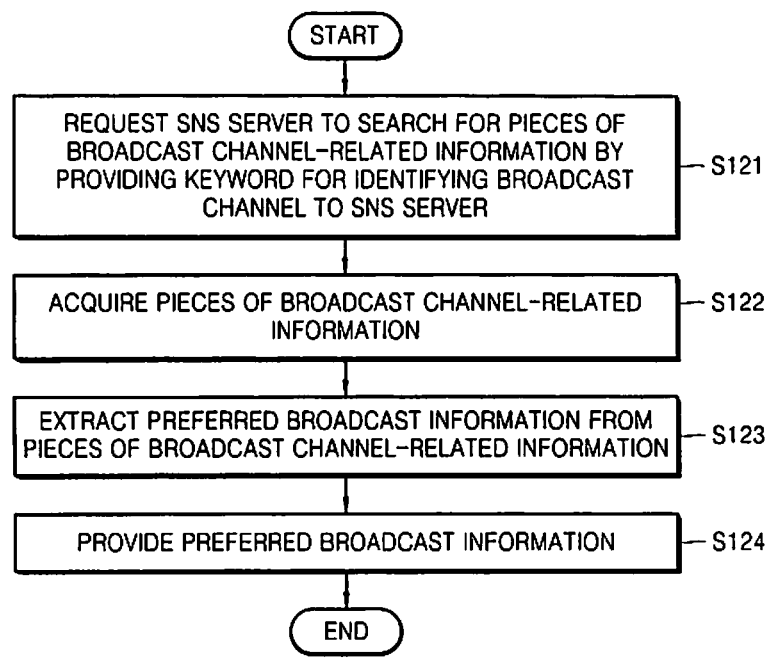
FIG. 12 is a flowchart illustrating a method of providing preferred broadcast information, according to an embodiment of the present invention.

FIG. 12 is a flowchart illustrating a method of providing preferred broadcast information, according to an embodiment of the present invention.

In step S121, the apparatus 120 generates a keyword about a broadcast channel/program. Next, the apparatus 120 requests the SNS server 110 to search for pieces of broadcast channel-related information by using the keyword for the broadcast channel/program that is being currently watched.

In step S122, the apparatus 120 acquires the pieces of broadcast channel-related information from the SNS server 110.

In step S123, the apparatus 120 extracts at least one piece of preferred broadcast information from the pieces of broadcast channel-related information.

In step S124, the at least one piece of preferred broadcast information is provided.

Figure 13:
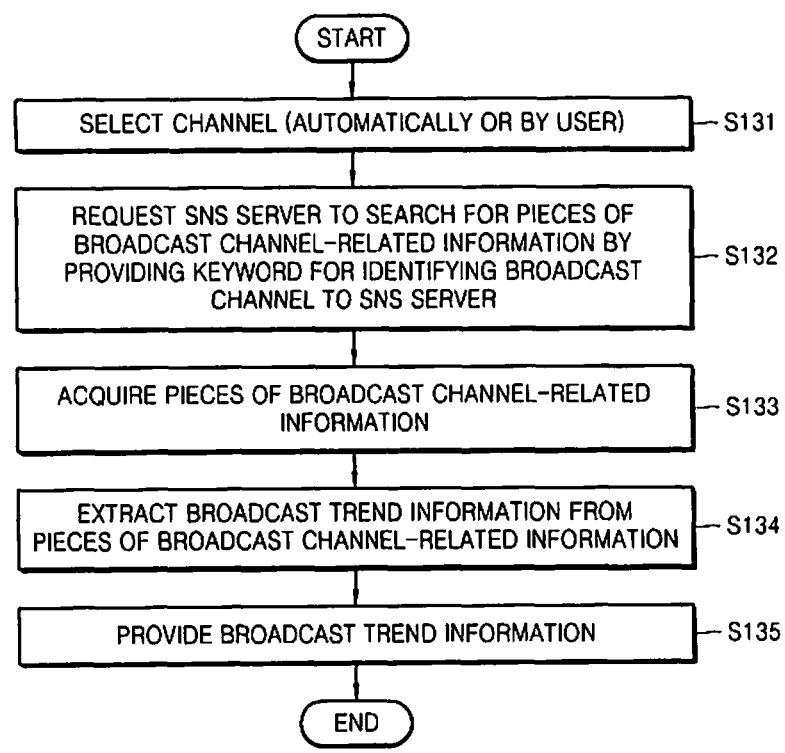
FIG. 13 is a flowchart illustrating a method of providing broadcast trend information, according to an embodiment of the present invention.

FIG. 13 is a flowchart illustrating a method of providing broadcast trend information, according to an embodiment of the present invention.

In step S131, the apparatus 120 selects a broadcast channel/program automatically or via a user input signal. The broadcast channel/program may be a broadcast channel/program that a user is currently watching or another broadcast channel/program that is selected by the user.

In step S132, the apparatus 120 generates a keyword for the broadcast channel/program. The apparatus 120 requests the SNS server 110 to search using the keyword for the broadcast channel/pro gram.

In step S133, the apparatus 120 acquires pieces of broadcast channel-related information from the SNS server 110.

In step S134, the apparatus 120 extracts at least one piece of broadcast trend information from the pieces of broadcast channel-related information. The text and times of the pieces of broadcast channel-related information are analyzed to determine the broadcast trend information. By analyzing the texts, a keyword that is often used, a user who continuously provides information, a time when popularity increases, a scene of a time when popularity increases, or the like is able to be extracted. The extracted keyword, URL, or the like, is a real-time broadcast trend related to the channel/program.

In step S135, the at least one broadcast trend information is provided to the user.

Figure 14:
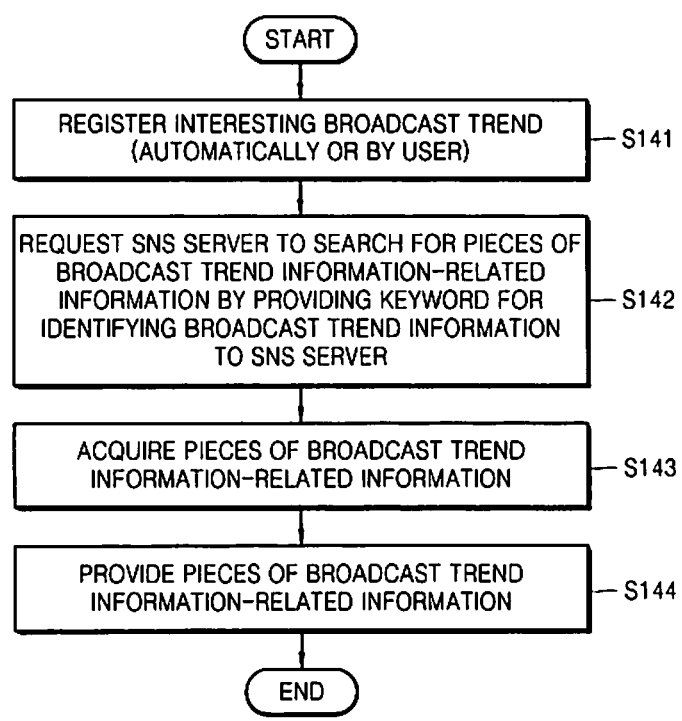
FIG. 14 is a flowchart illustrating a method of tracking broadcast trend information, according to an embodiment of the present invention.

FIG. 14 is a flowchart illustrating a method of tracking broadcast trend information, according to an embodiment of the present invention.

In step S141, the apparatus 120 registers at least one piece of broadcast trend information as an interesting broadcast trend based on a user input signal.

In step S142, the apparatus 120 requests that the SNS server 110 track information related to the at least one piece of broadcast trend information posted on an SNS by providing at least one keyword for identifying the at least one piece of broadcast trend information to the SNS server 110.

In step S143, the apparatus 120 acquires the information related to the at least one piece of broadcast trend information from the SNS server 110.

In step S144, the apparatus 120 provides the information related to the at least one piece of broadcast trend information in real-time.

Figure 15:
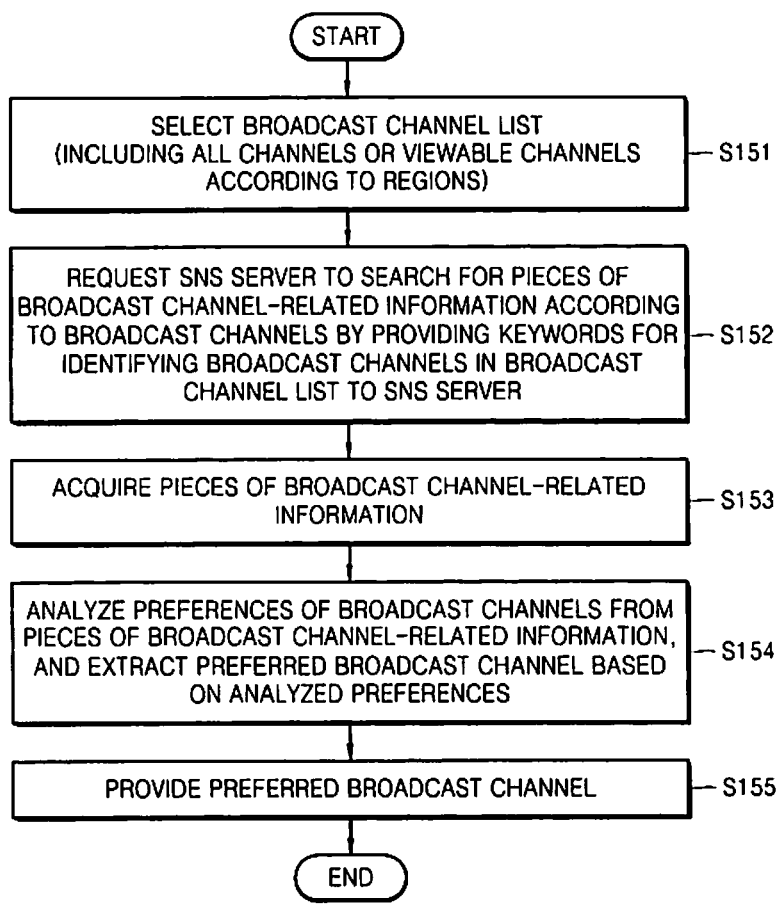
FIG. 15 is a flowchart illustrating a method of providing real-time preferred broadcast channel information, according to an embodiment of the present invention.

FIG. 15 is a flowchart illustrating a method of providing preferred broadcast channel information, according to an embodiment of the present invention.

In step S151, the apparatus 120 selects a broadcast channel list using an input signal. The list may include channels that are viewable according to regions or all channels.

In step S152, the apparatus 120 requests that the SNS server 110 search for pieces of broadcast channel-related information posted in real-time on an SNS according to broadcast channels in the broadcast channel list by providing keywords that identify the broadcast channels in the broadcast channel list to the SNS server 110. Specifically, the apparatus 120 generates keywords for broadcast channels that are viewable according to a specific region or for all broadcast channels. Next, the apparatus 120 requests the SNS server 110 for search by using the generated keywords. In this case, the search is performed according to the generated keywords.

In step S153, the apparatus 120 acquires the pieces of broadcast channel-related information from the SNS server 110.

In step S154, the apparatus 120 determines preferences of the broadcast channels from the pieces of broadcast channel-related information. Analyzed information may include a number and corresponding time of results for each channel in the real-time search results. At least one preferred broadcast channel is extracted from the broadcast channels based on the determined preferences.

In step S155, the at least one preferred broadcast channel is provided to the user. The real-time preferred broadcast channels may be arranged in a preference order.

The embodiments of the present invention may be embodied as computer-readable codes in a computer-readable recording medium. The computer-readable recording medium may be any recording apparatus capable of storing data that is read by a computer system. Examples of the computer-readable recording medium include Read-Only Memories (ROMs), Random-Access Memories (RAMs), CD-ROMs, magnetic tapes, floppy disks, and optical data storage devices. The computer-readable recording medium may be a carrier wave that transmits data via the Internet, for example. The computer readable medium may be distributed among computer systems that are interconnected through a network, and the present invention may be stored and implemented as computer readable codes in the distributed system. Functional programs, codes, and code segments for embodying the present invention may be easily derived by programmers in the technical field to which the present invention pertains.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of providing preferred broadcast information to a user of a channel broadcasting apparatus, the method comprising the steps of:
    selecting the preferred broadcast information which the user wants to acquire, wherein the preferred broadcast information includes at least one of broadcast trend information and preferred broadcast channel information;
    requesting that a Social Networking Service (SNS) server search for pieces of information in an SNS that are related to at least one broadcast by generating and providing at least one keyword that identifies a selected broadcast channel or a broadcast channel list based on the selected preferred broadcast information to the SNS server according to the user's selection;
    acquiring the pieces of information about the selected broadcast channel or the broadcast channel list that is identified by the at least one keyword from the SNS server;
    extracting the preferred broadcast information from the pieces of information about the selected broadcast channel or the broadcast channel list; and
    providing the preferred broadcast information to the user of the channel broadcasting apparatus.

2. The method of claim 1, wherein the pieces of information comprise information posted to the SNS in real-time by users of the SNS that are from at least one of a group of all users using the SNS, a group of users registered as friends of the user in the SNS, and a group of users registered as members of particular concern in the SNS.

3. The method of claim 1, further comprising determining a broadcast channel,
   wherein the at least one keyword is a keyword that identifies the determined broadcast channel or a broadcast program of the determined broadcast channel.

4. The method of claim 3, wherein determining the broadcast channel comprises manually receiving an indication of the broadcast channel via a user input signal, or automatically receiving an indication of the broadcast channel that is being currently watched via a Program and System Information Protocol (PSIP).

5. The method of claim 1, wherein extracting the preferred broadcast information comprises determining a number of times that each item of broadcast trend information appears in a predetermined period of time in the pieces of information, and extracting the at least one item of broadcast trend information, and
   wherein the at least one item of broadcast trend information comprises at least one of a keyword related to the selected broadcast channel or the broadcast channel list, a user IDentifier (ID), and a Uniform Resource Locator (URL).

6. The method of claim 5, further comprising:
   requesting that the SNS server track information related to the at least one item of broadcast trend information that is posted in the SNS by providing at least one keyword for identifying the at least one item of broadcast trend information to the SNS server.

7. The method of claim 1,
   wherein extracting the preferred broadcast information comprises:
   determining preferences of the broadcast channels from the pieces of information, and
   extracting at least one preferred broadcast channel from broadcast channels in the broadcast channel list based on the determined preferences.

8. The method of claim 7, wherein the broadcast channel list comprises at least one of viewable channels and non-viewable channels based on a location of the user.

9. The method of claim 7, wherein extracting the at least one preferred broadcast channel comprises determining a preference for each of the broadcast channels based on at least one of a number of pieces of information for each broadcast channel, a number of users that provide the pieces of information for each broadcast channel, and a distribution of times when the pieces of information are provided for each broadcast channel, and extracting the at least one preferred broadcast channel.

10. An apparatus for providing preferred broadcast information, the apparatus comprising:
    a remote control unit that sends a signal, which is generated by selection of a user, for acquiring broadcast trend information or preferred broadcast channel information;
    a Social Networking Service (SNS) searcher that requests that an SNS server search for pieces of information in an SNS that are related to a selected broadcast channel or a broadcast channel list based on the selected preferred broadcast information by generating and providing at least one keyword that identifies the selected broadcast channel or the broadcast channel list to the SNS server according to the user's selection, and acquires the pieces of information about the selected broadcast channel or the broadcast channel list that is identified by the at least one keyword from the SNS server;
    a preferred broadcasting information extractor that extracts the preferred broadcast information based on the pieces of information about the selected broadcast channel or the broadcast channel list; and
    a preferred broadcast information provider that provides the preferred broadcast information to a user of the apparatus.

11. The apparatus of claim 10, wherein the pieces of information comprise information posted to the SNS in real-time by users of the SNS that are from at least one of a group of all users using the SNS, a group of users registered as friends of the user in the SNS, and a group of users registered as members of particular concern in the SNS.

12. The apparatus of claim 10, further comprising a communication interface that determines a broadcast channel,
    wherein the at least one keyword is a keyword that identifies the determined broadcast channel or a broadcast program of the determined broadcast channel.

13. The apparatus of claim 12, wherein the communication interface manually receives an indication of the broadcast channel via a user input signal, or automatically receives an indication of the broadcast channel that is currently being watched via a Program and System Information Protocol (PSIP).

14. The apparatus of claim 10, wherein the preferred broadcast information extractor further comprises a broadcast trend information extractor that determines a number of times that each item of broadcast trend information appears in a predetermined period of time in the pieces of information, and extracts the at least one item of broadcast trend information, and
    wherein the at least one item of broadcast trend information comprises at least one of a keyword related to the selected broadcast channel or the broadcast channel list, a user IDentifier (ID), and an Uniform Resource Locator (URL).

15. The apparatus of claim 14, wherein the SNS searcher requests that the SNS server track information related to the at least one item of broadcast trend information posted in the SNS by providing at least one keyword for identifying the at least one item of broadcast trend information to the SNS server.

16. The apparatus of claim 10, wherein, when the SNS searcher requests that the SNS server search for pieces information, the selected broadcast channel or the broadcast channel list comprises broadcast channels in a broadcast channel list, and
    wherein the preferred broadcast information extractor further comprises a preferred broadcast channel extractor that determines preferences of the broadcast channels from the pieces of information, and extracts at least one preferred broadcast channel from the broadcast channels based on the determined preferences.

17. The apparatus of claim 16, further comprising a storage unit that stores the broadcast channel list, wherein the broadcast channel list comprises at least one of viewable channels and non-viewable channels based on a location of the user.

18. The apparatus of claim 16, wherein the preferred broadcast channel extractor determines a preference for each of the broadcast channels based on at least one of a number of pieces of information for each broadcast channel, a number of users that provide the pieces of information for each broadcast channel, and a distribution of times when the pieces of information are provided for each broadcast channel, and extracts the at least one preferred channel.

19. The apparatus of claim 10, wherein the apparatus comprises an apparatus having a television (TV) watching function.

20. A non-transitory computer-readable recording medium having embodied thereon a program for executing a method of providing preferred broadcast information to a user of a channel broadcasting apparatus, the method comprising the steps of:
- selecting the preferred broadcast information which the user wants to acquire, wherein the preferred broadcast information includes at least one of broadcast trend information and preferred broadcast channel information;
- requesting that a Social Networking Service (SNS) server search for pieces of information in an SNS that are related to a selected broadcast channel or a broadcast channel list based on the selected preferred broadcast information by generating and providing at least one keyword that identifies the selected broadcast channel or the broadcast channel list to the SNS server according to the user's selection;
- acquiring the pieces of information about the selected broadcast channel or the broadcast channel list that is identified by the at least one keyword from the SNS server;
- extracting the preferred broadcast information from the pieces of information about the selected broadcast channel or the broadcast channel list; and
- providing the preferred broadcast information to the user of the channel broadcasting apparatus.

* * * * *